United States Patent
Tanaka

[19]

[11] Patent Number: 6,134,074
[45] Date of Patent: *Oct. 17, 2000

[54] REPRODUCING APPARATUS HAVING TRACKING CONTROL IN ACCORDANCE WITH TRACK NUMBER INFORMATION

[75] Inventor: Shuya Tanaka, Kanagawa-ken, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/827,839

[22] Filed: Apr. 11, 1997

Related U.S. Application Data

[62] Division of application No. 08/332,334, Oct. 31, 1994, abandoned.

[30] Foreign Application Priority Data

Nov. 16, 1993 [JP] Japan ..................................... 5-286878

[51] Int. Cl.$^7$ .................................................. G11B 5/584
[52] U.S. Cl. ............................ 360/77.14; 360/64; 386/79
[58] Field of Search ................................... 360/71, 77.14, 360/78.02, 64, 18, 72.1, 72.2; 386/85, 88, 95, 113, 78, 79

[56] References Cited

U.S. PATENT DOCUMENTS

| | | | |
|---|---|---|---|
| 4,791,497 | 12/1988 | Nakano et al. | 360/32 |
| 4,803,570 | 2/1989 | Kashida et al. | 360/61 |
| 5,081,550 | 1/1992 | Yagisawa et al. | 360/78.02 |
| 5,402,275 | 3/1995 | Nishido | 360/51 |
| 5,546,248 | 8/1996 | Sakakibara et al. | 360/77.14 |
| 5,617,268 | 4/1997 | Sakakibara et al. | 360/77.14 |
| 5,648,879 | 7/1997 | Takano | 360/77.14 X |

FOREIGN PATENT DOCUMENTS

| | | |
|---|---|---|
| 0343726 | 11/1989 | European Pat. Off. . |
| 0574238 | 6/1992 | European Pat. Off. . |
| 0560596 | 9/1993 | European Pat. Off. . |
| 0564234 | 10/1993 | European Pat. Off. . |
| 0587320 | 3/1994 | European Pat. Off. . |
| 0630010 | 12/1994 | European Pat. Off. . |

*Primary Examiner*—Andrew L. Sniezek
*Attorney, Agent, or Firm*—Robin, Blecker & Daley

[57] ABSTRACT

There is provided a reproducing apparatus arranged to reproduce an information signal from a recording medium on which a number of recording tracks are formed in parallel with each other and the information signal is recorded on the recording tracks together with track number information indicative of numbers of the respective tracks, a pilot signal component being multiplexed onto the information signal periodically at intervals of a predetermined number of tracks. When the information signal is to be reproduced from the recording medium, the reproducing apparatus executes tracking control of the reproducing head with respect to a target track, by using the pilot signal component contained in a signal reproduced by a reproducing head. The reproducing apparatus determines the target track according to the track number information separated from the signal reproduced by the reproducing head. According to the above-described arrangement, it is possible to execute correct tracking control quickly after the start of reproduction. In addition, since the track number information recorded on the recording medium in a multiplexed manner is effectively utilized, it is not necessary to provide a special circuit for determining the target track.

6 Claims, 6 Drawing Sheets

REPRODUCING APPARATUS HAVING TRACKING CONTROL IN ACCORDANCE WITH TRACK NUMBER INFORMATION

This is a divisional application under 37 CFR 1.62 of prior application Ser. No. 08/332,334, filed Oct. 31, 1994 now abandoned.

BACKGROUND OF THE INVENTION

1. Field of the Invention

The present invention relates to an apparatus for reproducing a signal from a number of tracks formed on a recording medium and, more particularly, to tracking control for use in the apparatus.

2. Description of the Related Art

Two types of reproduction tracking systems for domestic-use video tape recorders (VTRs) have heretofore been proposed and put into practice. One type of reproduction tracking system is a dedicated control track system (CTL system) which is arranged to record a vertical synchronizing signal separated from a recorded signal on a tape in the longitudinal direction thereof by means of a fixed, magnetic head which is provided at a location on a tape path. The other type of reproduction tracking system is a system (4fATF system) in which four kinds of pilot signals having different, comparatively low frequencies are cyclically recorded in a multiplexed manner on a track on which a main signal is recorded. In such a 4fATF system, during reproduction, crosstalk components reproduced from both tracks adjacent to a track from which a main signal is reproduced are compared with each other to obtain a tracking error signal (ATF error signal).

However, the CTL system is disadvantageous to a reduction in the size of the entire assembly since a space for the fixed head is needed. In contrast, the 4fATF system is advantageous to a reduction in the size of the entire assembly, but the four kinds of pilot signals are needed.

In recent years, the digitization of domestic-use VTRs has proceeded and the image quality thereof has increasingly been improved. In such a situation, VTRs which are arranged to record an image signal for one field on a plurality of tracks in divided form have been developed so that a comparatively large amount of information can be recorded or reproduced, and tracking systems for use in such VTRs have been considered.

One example of such a tracking system will be described below in brief.

As is known, general VTRs are arranged to form a number of helical tracks and record a video signal on each of the helical tracks. In this tracking system, pilot signals are multiplexed on the video signal every other track. More specifically, two kinds of pilot signals f1 and f2 having different frequencies are alternately recorded in units of one track; that is to say, each of the pilot signals f1 and f2 is multiplexed periodically at intervals of four tracks.

During reproduction, when a reproducing head reproduces a main signal from a track on which no pilot signal is multiplexed, crosstalk components of the pilot signals f1 and f2 derived from both tracks adjacent to that track are picked up from the output of the reproducing head, and the crosstalk components are compared with each other. A tracking error signal (ATF error signal) is obtained from the result of this comparison.

The aforesaid pilot signals may be multiplexed in such a way that an analog pilot signal is simply multiplexed onto a digital video signal. As another approach, the method of controlling modulation to add a pilot signal as a frequency component of a digital modulated signal has been proposed.

The above brief description has been made in connection with the arrangement of the VTR system and the tracking system on both of which preferred embodiments of the present invention to be described later are based. The present tracking system is hereinafter referred to as the "2fATF system".

According to the above-described 2fATF system, a pilot-signal generating rotation and the recording or reproduction of frames are synchronized with each other in units of two frames (twenty tracks) in the case of a VTR which is arranged to record one frame on ten tracks. For this reason, owing to a reversal of the positional order of the tracks on which the pilot signals f1 and f2 are respectively recorded, if reproduction is started from an odd frame, a head for a channel 1 reproduces f2+f1 as a crosstalk component, while a head for a channel 3 reproduces f1+f2 as a crosstalk component, and, if reproduction is started from an even frame, the head for the channel 1 reproduces f1+f2 as a crosstalk component, while the head for the channel 3 reproduces f2+f1 as a crosstalk component. Accordingly, if a logic for an ATF error signal is selected in synchronism with a head switching signal, the logic for the ATF error signal for coping with a track deviation is inverted when reproduction is started from an even frame. As a result, even if tracking deviates, tracking control will be executed so that the tracking is deviated to a further extent.

One approach to the tracking deviation is to execute recording by necessarily starting a recording from an odd frame and completing the recording on an even frame and to execute reproduction by necessarily starting a reproduction from an odd frame and completing the reproduction on an even frame. However, this approach is not practical, since all operating modes, such as recording and reproduction, must be performed in units of two frames.

SUMMARY OF THE INVENTION

It is, therefore, an object of the present invention to solve the above-described problems.

Another object of the present invention is to provide a signal reproducing apparatus capable of accomplishing tracking control quickly after the start of reproduction.

To achieve the above-described objects, according to one aspect of the present invention, there is provided a reproducing apparatus arranged to reproduce an information signal from a recording medium on which a number of recording tracks are formed in parallel with each other and the information signal is recorded on the recording tracks together with track number information indicative of numbers of the respective recording tracks, a pilot signal component being multiplexed onto the information signal periodically at intervals of a predetermined number of tracks. The reproducing apparatus comprises a reproducing head, tracking control means for executing tracking control of the reproducing head with respect to a target track, by using the pilot signal component contained in a signal reproduced by the reproducing head, and determining means for determining the target track according to the track number information separated from the signal reproduced by the reproducing head.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Figure 1A:
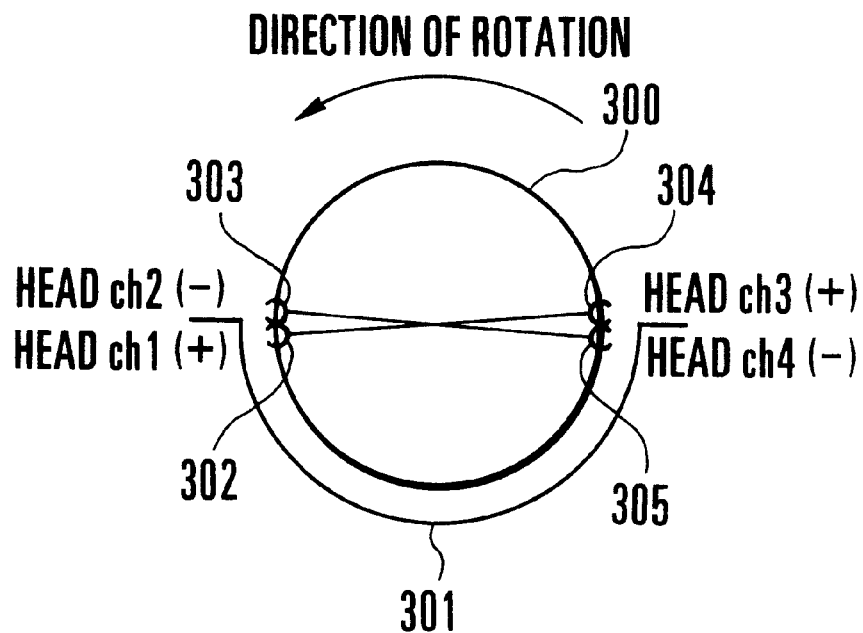
FIGS. 1(a) and 1(b) are schematic views respectively showing a drum for a VTR to which the present invention is applied and the arrangement of the heads of the drum.

FIG. 1(a) is a schematic, top plan view of a drum for a VTR to which the present invention is applied. A rotary drum 300 includes a head (ch1) 302 having a plus (+) azimuth and corresponding to a channel 1, a head (ch2) 303 having a minus (−) azimuth and corresponding to a channel 2, a head (ch3) 304 having a plus (+) azimuth and corresponding to a channel 3, and a head (ch4) 305 having a minus (−) azimuth and corresponding to a channel 4. Reference numeral 301 denotes a tape.

Figure 1B:
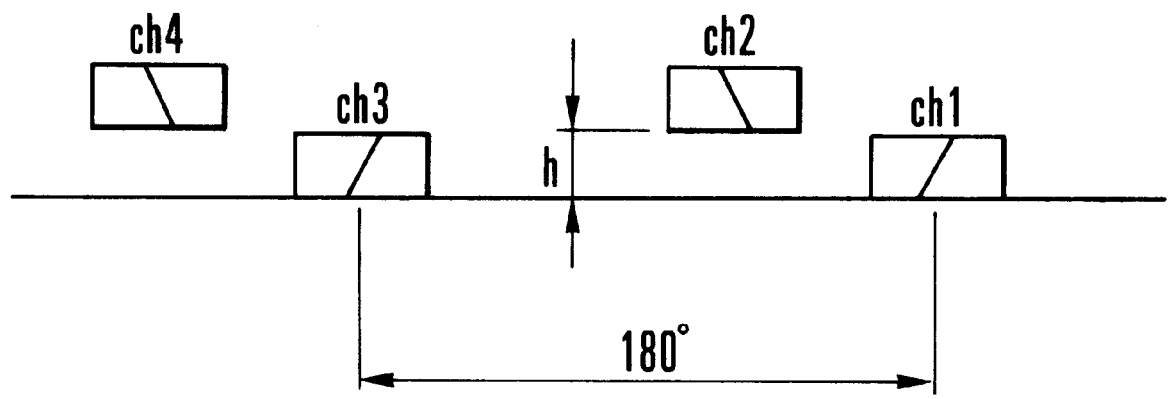

FIG. 1(b) is a schematic view showing the heights of the respective heads ch1, ch2, ch3 and ch4 as viewed from the front side of the rotary drum 300 during the rotation thereof. The heads ch1 and ch2 as well as ch3 and ch4 are disposed in pairs in close proximity to each other. Each of the pairs is spaced 180° apart from the other and, as can be seen from FIG. 1(b), the heads ch2 and ch4 are offset from the heads ch1 and ch3 by a distance h which approximately corresponds to a one-track pitch. In such an arrangement, it is possible to concurrently record or reproduce signals on or from two tracks at intervals of a half rotation of the rotary drum 300, so that it is possible to cope with a large amount of information.

Figure 2:
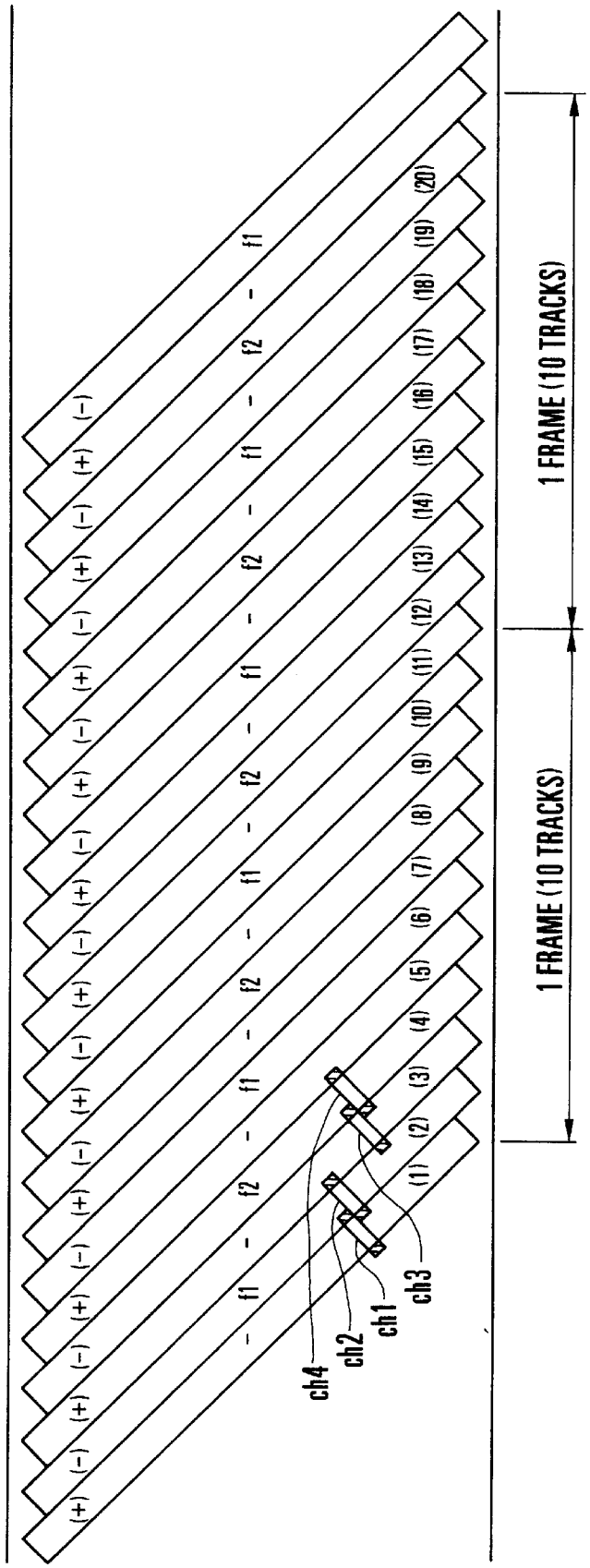
FIG. 2 is a schematic view showing a recording pattern formed on a tape in the VTR according to an embodiment of the present invention.

FIG. 2 is a view showing a recording pattern. Two kinds of pilot signals f1 and f2 are used for providing a tracking error signal, and are recorded in such a manner as to be multiplexed onto a main signal in alternate sequence and every other track. A drum rotation for four tracks constitutes the pilot-signal generating rotation required to generate the pilot signals f1 and f2. Neither of the pilot signals f1 and f2 is multiplexed onto any of the tracks formed by the heads ch1 and ch3 of plus (+) azimuth, whereas the pilot signals f1 and f2 are alternately multiplexed onto the tracks formed by the heads ch2 and ch4 of minus (−) azimuth. The numerals (1) to (10) shown in FIG. 2 respectively denote the sequential numbers of the tracks formed when a signal for one frame is recorded over ten tracks in divided form, and the numerals (11) to (20) shown in FIG. 2 also respectively denote the sequential numbers of the tracks formed in a similar manner. In this embodiment, since signals for four tracks are recorded or reproduced through one rotation of the rotary drum 300 as described above, 2.5 rotations of the rotary drum 300 are needed to scan all tracks for one frame, and the recording or reproduction of frames and the pilot-signal generating rotation are synchronized with each other in units of two frames (twenty tracks).

Figure 3:
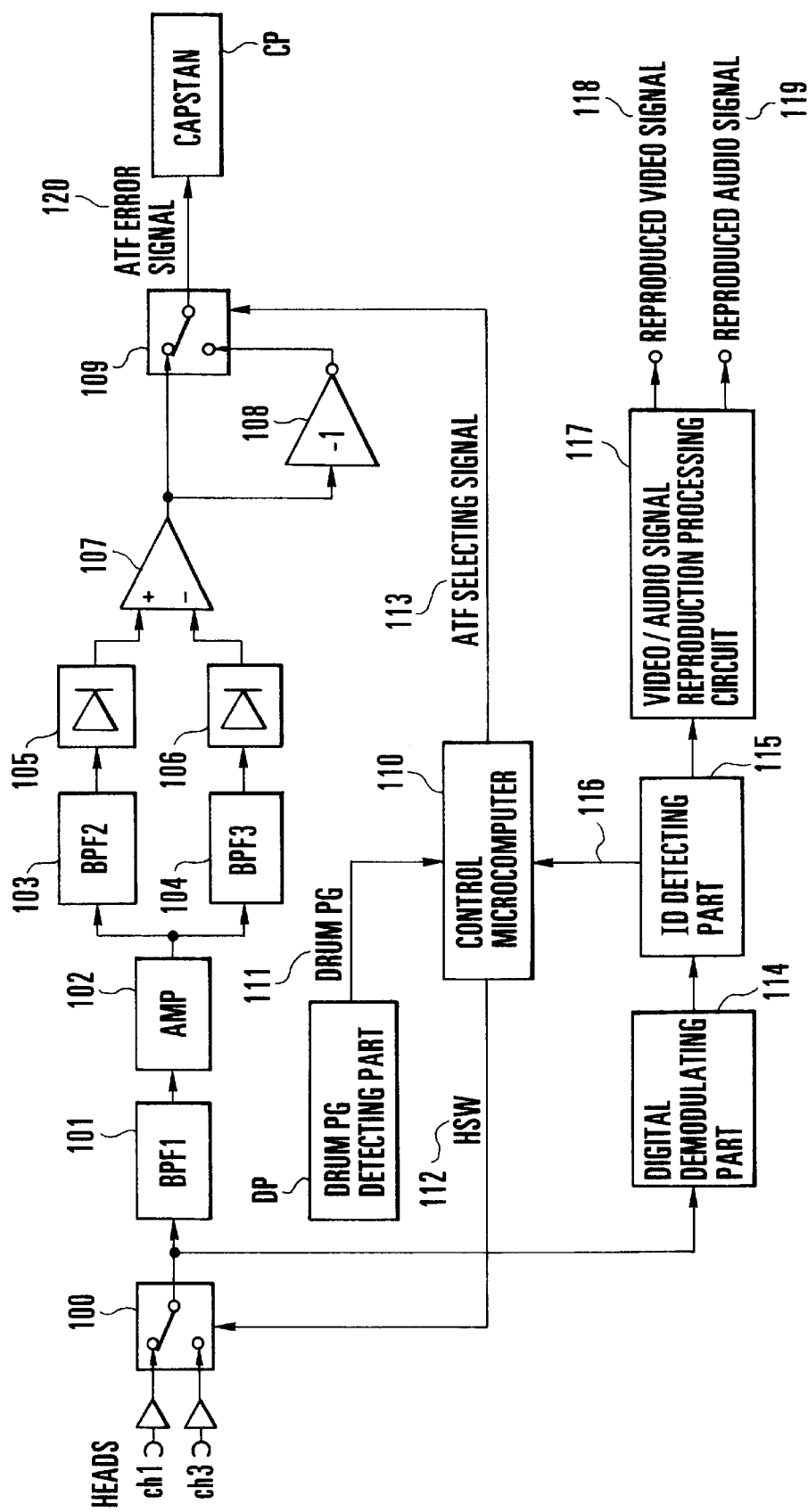
FIG. 3 is a block diagram schematically showing the arrangement of the reproducing system of the VTR according to the embodiment of the present invention.

FIG. 3 is a block diagram of the essential portion of the reproducing circuit used in the 2fATF-system 4-head VTR to which the embodiment of the present invention is applied. The shown reproducing circuit includes a switching circuit 100 for selecting either one of the reproduced signal outputs of the heads ch1 and ch3, a band-pass filter 101 (BPF1) for extracting a frequency band which contains the pilot signals f1 and f2 from the reproduced signal output selected by the switching circuit 100, an amplifier 102 for amplifying the reproduced pilot signals f1 and f2 outputted from the band-pass filter 101 (BPF1), a band-pass filter 103 (BPF2) for extracting only the frequency component of the pilot signal f2 from the output of the amplifier 102, a band-pass filter 104 (BPF3) for extracting only the frequency component of the pilot signal f1 from the output of the amplifier 102, a detecting circuit 105 for converting the frequency component of the pilot signal f2 outputted from the band-pass filter 103 (BPF2) into a DC component, a detecting circuit 106 for converting the frequency component of the pilot signal f1 outputted from the band-pass filter 104 (BPF3) into a DC component, a differential amplifier circuit 107 which receives as its inputs the outputs of the detecting circuit 105 and the detecting circuit 106, an inverting amplifier 108, a switching circuit 109 for selecting either one of the output of the differential amplifier circuit 107 and the output of the inverting amplifier 108, and a control microcomputer 110 for generating a head switching signal (HSW) 112 and an ATF selecting signal 113 from a drum rotation detection signal (drum PG) 111 which will be described later and intraframe track information 116 which will be described later. The drum rotation detection signal (drum PG) 111 is obtained by the rotation of the rotary drum 300 being detected by a drum PG detecting part DP. The head switching signal 112 serves to switch the reproduced signal outputs of the heads ch1 and ch3 in synchronism with the rotation of the rotary drum 300. The ATF selecting signal 113 serves to switch the output of the differential amplifier circuit 107 and the output of the inverting amplifier 108.

The shown reproducing circuit also includes a digital demodulating part 114 for demodulating the main signal contained in the selected signal outputted from the switching circuit 100 into digital data, an identification data (ID) detecting part 115 for detecting identification data (ID) which contains the intraframe track information 116 multiplexed as digital data, from the demodulated digital data provided by the digital demodulating part 114, and a video/audio signal reproduction processing circuit 117 for demodulating a video signal and an audio signal, which constitute the main signal, from the demodulated digital data. The video/audio signal reproduction processing circuit 117 outputs the demodulated video and audio signals as a reproduced video signal 118 and a reproduced audio signal 119. An ATF error signal 120 serves to control the rotational speed of a capstan CP for transporting a tape in the longitudinal direction thereof.

Figure 4:
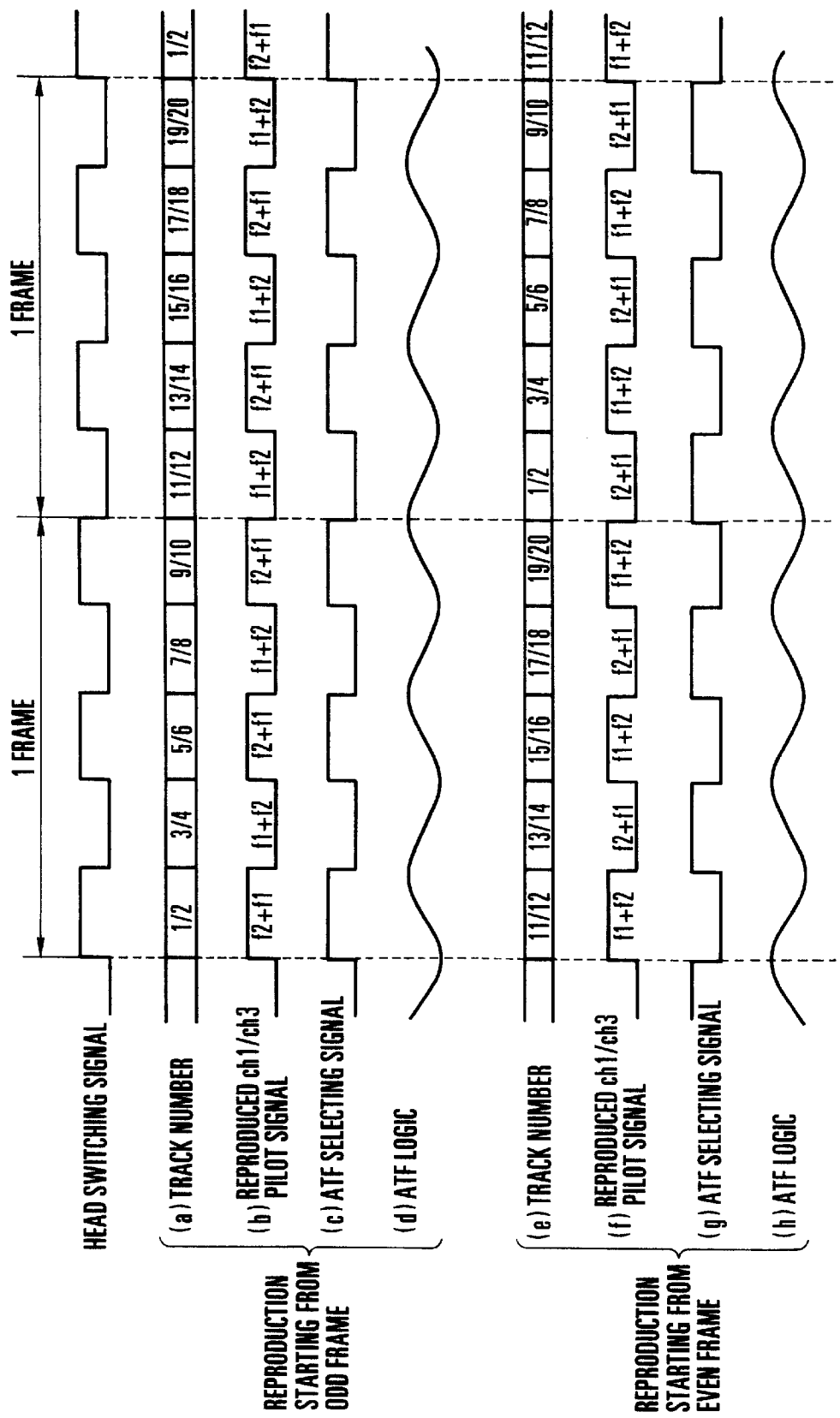
FIG. 4 is a timing chart showing the timing of each signal shown in FIG. 3.

FIG. 4 is a timing chart showing the timing waveforms obtained when the respective signals used in the embodiment shown in FIG. 3 are reproduced in a normal reproduction mode. Part (a) of FIG. 4 shows the intraframe track information 116 obtained when reproduction is started from an odd frame, i.e., information indicative of the track number of a track from which a recorded signal is currently being reproduced. Part (b) of FIG. 4 shows the timing of the reproduced pilot signals f1 and f2 which are obtained when reproduction is started from the odd frame. Part (c) of FIG. 4 shows the ATF selecting signal 113 which is obtained during that time. Part (d) of FIG. 4 is an ATF logic which is obtained during that time. Part (e) of FIG. 4 shows the intraframe track information 116 obtained when reproduction is started from an even frame, i.e., information indicative of the track number of a track from which a recorded signal is currently being reproduced. Part (f) of FIG. 4 shows the timing of the reproduced pilot signals f1 and f2 which are obtained when reproduction is started from the even frame. Part (g) of FIG. 4 shows the ATF selecting signal 113 which is obtained during that time. Part (h) of FIG. 4 is an ATF logic which is obtained during that time.

The operation of the reproducing circuit according to the present embodiment will be described below with reference to FIGS. 3 and 4.

As described above, the pilot signals f1 and f2 from which to obtain the ATF error signal are contained in a signal reproduced by each of the (+) azimuth heads ch1 and ch3, in the form of crosstalk components derived from both adjacent tracks ((−) azimuth tracks). Accordingly, to obtain the ATF error signal, the reproducing circuit according to the present embodiment needs only the reproduced signals outputted from the heads ch1 and ch3. The switching circuit 100 alternately selects one of the reproduced signals outputted from the heads ch1 and ch3 and outputs a serial reproduced signal. Since this reproduced signal contains a main signal, the reproduced signal is conducted to the video/audio signal reproduction processing circuit 117 through the digital demodulating part 114 and the ID detecting part 115. The reproduced signal outputted from the switching circuit 100 is also conducted to the band-pass filter 101 (BPF1) to extract the reproduced pilot signals f1 and f2 for an ATF circuit. The pilot signals f1 and f2 which are respectively contained as crosstalk components are separated and detected from the reproduced signal by the respective band-pass filters 104 (BPF3) and 103 (BPF2), and are then compared by the differential amplifier circuit 107. Thus, the differential amplifier circuit 107 outputs one tracking signal.

The intraframe track information 116 detected by the ID detecting part 115 is sent to the control microcomputer 110, and the control microcomputer 110 generates the ATF selecting signal 113 synchronized with the head switching signal (HSW) 112, according to whether reproduction has been started from the first track contained in an odd frame or the eleventh track contained in an even frame. The positional order of the tracks on which the pilot signals f1 and f2 are respectively recorded is reversed between the start of reproduction from the odd frame and the start of reproduction from the even frame. Accordingly, in the case of the start of reproduction from the odd frame, when the head ch3 is selected, the switching circuit 109 selects in synchronism with the ATF selecting signal 113 the output of the inverting amplifier 108 which has received the tracking signal outputted from the differential amplifier circuit 107. In the case of the start of reproduction from the even frame, when the head ch1 is selected, the switching circuit 109 selects the output of the inverting amplifier 108 in synchronism with the ATF selecting signal 113. Thus, the tracking signal outputted from the differential amplifier circuit 107 is formed into the ATF error signal 120 by the switching circuit 109.

As described above, the 2fATF system according to the present embodiment is arranged in such a manner that a positive logic or a negative logic for the ATF error signal is selected according to the intraframe track information, in view of the fact that the positional order of the tracks on which the pilot signals f1 and f2 are respectively recorded is reversed between the odd frame and the even frame. Accordingly, it is possible to quickly execute tracking control even in the case of the VTR in which the pilot-signal generating rotation and the recording or reproduction of frames are synchronized with each other in units of two frames. It is, therefore, possible to shift an operating mode in units of one frame. It is to be noted that the selection between the positive and negative logics for the ATF signal substantially means that either one of two tracks which are spaced two tracks apart from each other is selected as a target track to be subjected to tracking control.

Figure 5:
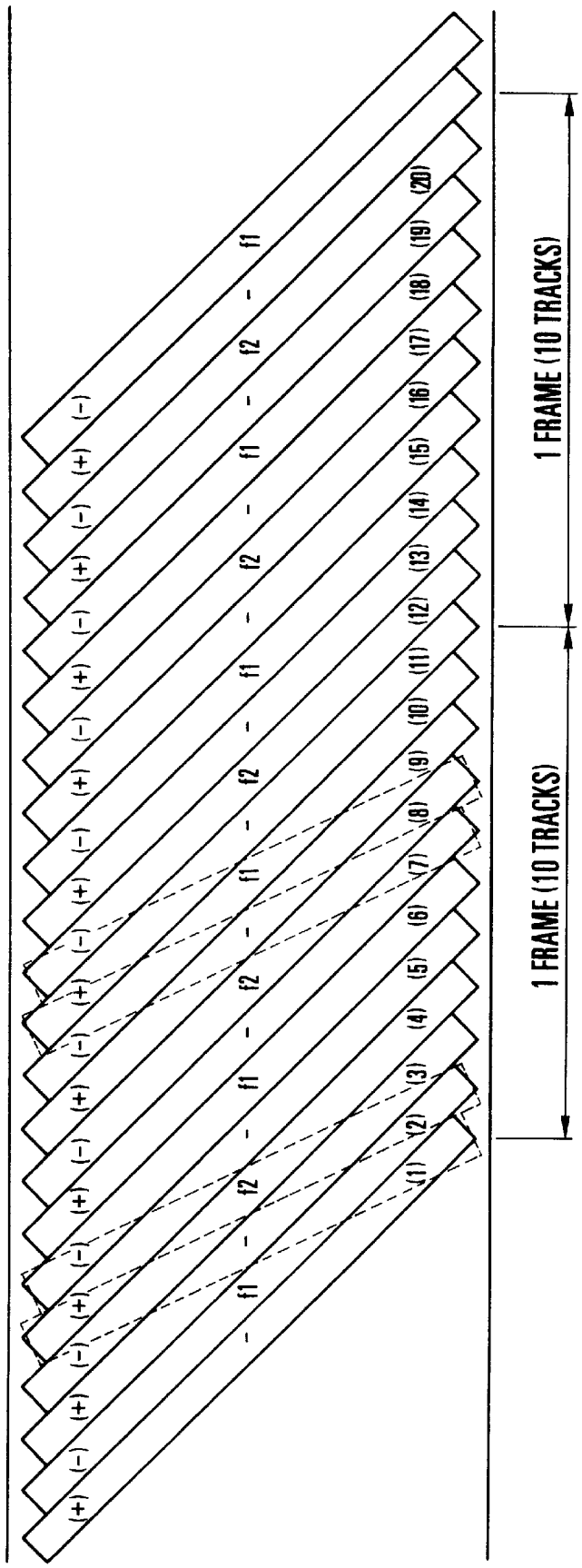
FIG. 5 is a schematic view showing trace loci formed on a tape when a triple-speed search is executed with the head arrangement shown in FIG. 1.

Although the description of the above embodiment has referred to the normal reproduction mode, another problem occurs when the VTR is in the triple-speed search reproduction mode shown in FIG. 5. For example, even if intraframe track information indicative of the first track is obtained and a logic for the ATF error signal is selected according to the intraframe track information, the trace of each head traverses a plurality of tracks, so that the logic is reversed halfway. As one example, the logic for the ATF error signal obtained from the third track is reverse to the logic for the ATF error signal obtained from the first track. This problem is solved by the arrangement shown in FIG. 6 as another embodiment.

Figure 6:
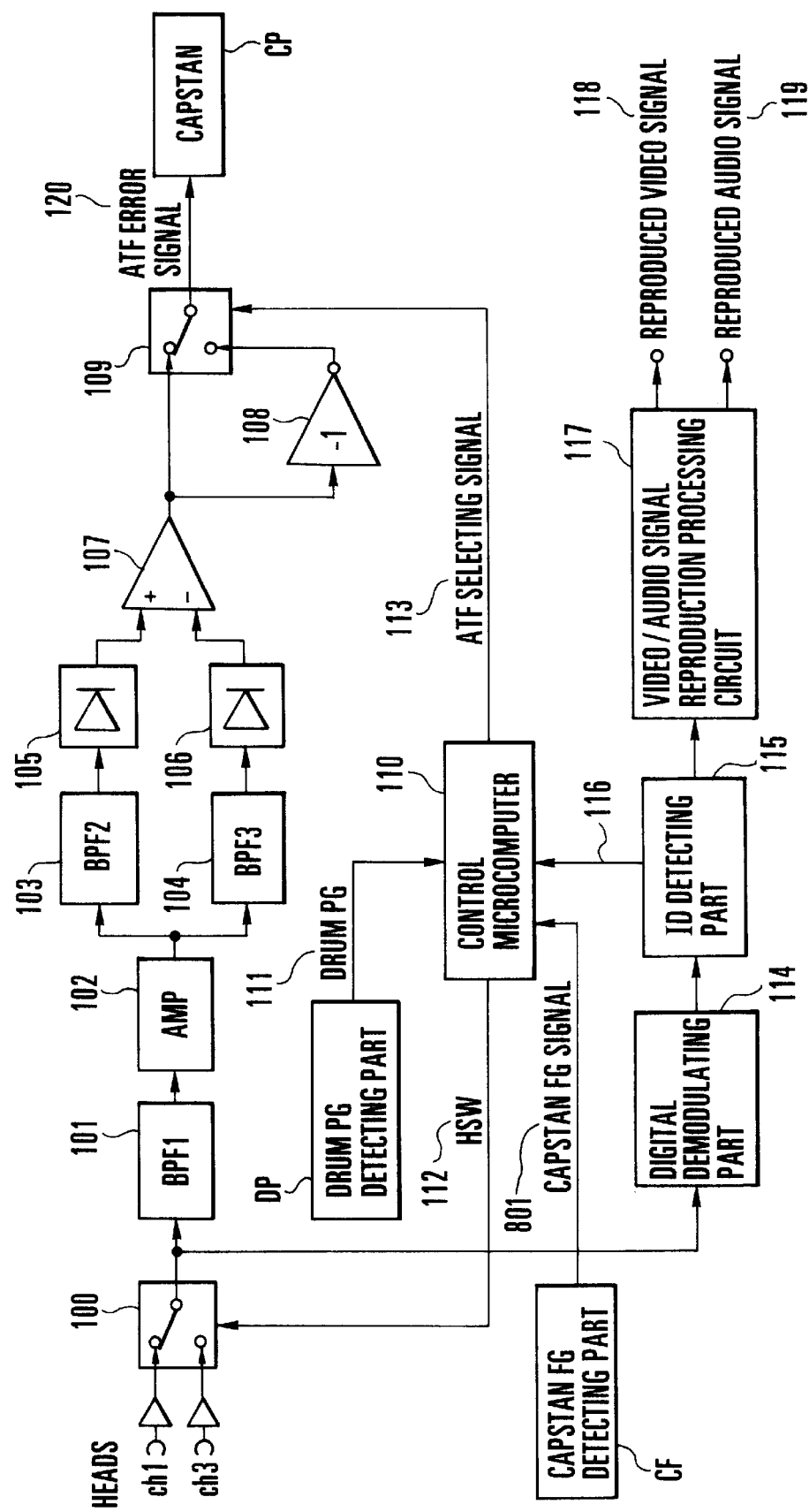
FIG. 6 is a block diagram schematically showing the arrangement of the reproducing system of a VTR according to another embodiment of the present invention.

In the arrangement shown in FIG. 6, the elements 100 to 120 are identical to the corresponding ones shown in FIG. 3. In FIG. 6, reference numeral 801 denotes a capstan FG signal indicative of the amount of travel of the tape obtained by detecting a rotation of the capstan CP by means of a capstan FG detecting part CF. In operation, an ATF selecting signal 113 based on a predication about the timing at which the corresponding head traverses a track during head tracing is generated on the basis of the intraframe track information 116 and the capstan FG signal 801. Accordingly, it is possible to always select a correct logic for the ATF error signal even during the triple-speed search reproduction mode, so that it is possible to effect correct tracking control.

Although the above description of each of the embodiments has referred to the 4-head VTR containing two pairs of heads, the present invention is not limited to this type of VTR. For example, the present invention can be applied to a general VTR in which two heads are spaced 180° apart from each other and which adopts a tracking error detecting system arranged not to multiplex a pilot signal on a main signal periodically at intervals of two tracks.

Although the intraframe track information used in each of the embodiments is numerical information indicative of particular numbers of from "1" to "20", the present invention is not limited to this type of information. The present invention can be applied to any type of track information that makes it possible to detect a pilot-signal generating rotation.

As is apparent from the foregoing description, the arrangement is adopted in which a logic for an ATF error signal is selected on the basis of the output signal of track information detecting means. Accordingly, even in an ATF system in which a pilot signal is multiplexed every other track so that the pilot-signal generating rotation and the recording or reproduction of frames are synchronized with each other in units of two frames, a logic for the ATF error signal can be selected at the same time that the first track in one frame is traced, so that correct tracking control can be effected over the subsequent tracks within the frame. Accordingly, it is possible to shift the operating mode in units of one frame.

What is claimed is:

1. A reproducing apparatus arranged to reproduce a video signal from a recording medium on which a number of recording tracks are formed in parallel with each other and frames of the video signal are recorded on a predetermined number of tracks together with identification information indicative of track numbers of the tracks, a pilot signal component being multiplexed onto the video signal periodically at intervals of four tracks, comprising:

(a) transporting means for transporting the recording medium in a direction transverse to the recording tracks;

(b) detecting means for detecting a transporting operation of said transporting means to generate a detection signal;

(c) reproducing means for reproducing the video signal and the identification information by periodically tracing the recording medium;

(d) generating means for generating a periodic signal having a period according to a tracing period of said reproducing means by using the detection signal;

(e) deriving means for deriving from the reproduced identification information the track numbers of the tracks;

(f) tracking control means for executing tracking control of said reproducing means so that said reproducing means traces one of target tracks which are arranged at intervals of four tracks by using the pilot signal component contained in a video signal reproduced by said reproducing means;

(g) determining means for determining a direction of the tracking control by using the periodic signal; and (h) shifting means for shifting the target tracks by only two tracks by changing the direction of the tracking control according to the track numbers derived from the signal reproduced by said reproducing means.

2. A reproducing apparatus according to claim 1, wherein the pilot signal component contains a first pilot signal component and second pilot signal component, said tracking control means including comparing means for making a comparison between the first and second pilot signal components contained in the signal reproduced by said reproducing means.

3. A reproducing apparatus according to claim 2, wherein said tracking control means generates a tracking error signal indicative of a positional relation between said reproducing means and the target tracks by using the first and second pilot signal components contained in the signal reproduced by said reproducing means, said shifting means determining a positive or negative logic for the tracking error signal.

4. A reproducing apparatus arranged to reproduce a video signal from a recording medium on which a number of recording tracks are formed in parallel with each other and frames of the video signal are recorded on a predetermined number of tracks together with the identification information indicative of track numbers of the tracks, a pilot signal component being multiplexed onto the video signal periodically at intervals of four tracks comprising:

(a) transporting means for transporting the recording medium in a direction transverse to the recording tracks;

(b) detecting means for detecting a transporting operation of said transporting means to generate a detection signal;

(c) reproducing means for reproducing the video signal and the identification information by periodically tracing the recording medium;

(d) generating means for generating a periodic signal having a period according to a tracing period of said reproducing means by using the detection signal;

(e) signal processing means for generating a tracking error signal indicative of a positional deviation of said reproducing means from target tracks which are arranged at intervals of four tracks, by using the pilot signal component contained in a signal reproduced by said reproducing means;

(f) deriving means for deriving from the reproduced identification information the track numbers of the tracks;

(g) control means for controlling a relative position of said reproducing means with respect to the recording medium by using the tracking error signal; and (h) shifting means for shifting the target tracks by only two tracks by effecting a positive or negative logic for the tracking error signal according to the track numbers derived from the signal reproduced by said reproducing means.

5. A reproducing apparatus according to claim 4, wherein the pilot signal component contains first and second pilot signal components, and each of the first and second signal components is recorded on the recording tracks periodically at intervals of four tracks.

6. A reproducing apparatus according to claim 5, wherein said signal processing means includes comparing means for making a comparison between the first pilot signal component and the second pilot signal component contained in the signal reproduced by said reproducing means.

* * * * *